United States Patent [19]

Matthews, Jr.

[11] 3,724,224
[45] Apr. 3, 1973

[54] METHOD FOR INSTALLING DOUBLE-WALLED PIPELINES

[75] Inventor: Jamie F. Matthews, Jr., Houston, Tex.

[73] Assignee: Esso Production and Research Company

[22] Filed: June 7, 1971

[21] Appl. No.: 150,497

[52] U.S. Cl. ...................... 61/72.3, 29/429, 138/113
[51] Int. Cl. ............................. F16l 1/00, F16l 7/00
[58] Field of Search............ 61/72.3, 72.1, 72.5, 72.7; 29/429; 285/18, 24, 27; 138/113, 114, 105; 166/.5, .6

[56] References Cited

UNITED STATES PATENTS

| | | | |
|---|---|---|---|
| 3,346,045 | 10/1967 | Knapp et al. | 166/.5 |
| 3,595,312 | 7/1971 | Matthews, Jr. | 166/.5 |
| 3,530,680 | 9/1970 | Gardner | 61/72.3 |
| 3,585,805 | 6/1971 | Vincent | 285/24 X |
| 3,604,731 | 9/1971 | Petersen | 29/429 X |
| 3,379,027 | 4/1968 | Mowell et al. | 61/46 X |

*Primary Examiner*—Jacob Shapiro
*Attorney*—James A. Reilly, John B. Davidson, Lewis H. Eatherton, James E. Gilchrist, Robert L. Graham and James E. Reed

[57] ABSTRACT

A double-walled pipeline is installed on the bottom of a body of water by installing a riser having a large bend near its lower end or a similar member at an offshore platform or other installation from which the pipeline is to extend, installing an outer pipe string along the pipeline route between the platform or other installation and the pipeline terminus, passing a cable through the riser or similar member and the outer pipe string, and then moving an inner pipe string into position within the riser or similar member and the outer pipe string.

18 Claims, 8 Drawing Figures

INVENTOR.
JAMIE F. MATTHEWS, JR.

BY James E. Reed

ATTORNEY

INVENTOR.
JAMIE F. MATTHEWS, JR.

BY James E. Reed

ATTORNEY

INVENTOR.
JAMIE F. MATTHEWS, JR.

BY *James E. Reed*

ATTORNEY

METHOD FOR INSTALLING DOUBLE-WALLED PIPELINES

BACKGROUND OF THE INVENTION

1. Field of the Invention

This invention relates to the installation of underwater pipelines and is particularly concerned with a method for installing double-walled pipelines betWeen offshore platforms or between an offshore platform and an onshore installation.

2. Description of the Prior Art

Underwater pipelines used for transporting crude oil, natural gas and similar materials are sometimes laid across channels, estuaries and other bodies of water where marine traffic is apt to be heavy. It is common practice to bury such lines and mark the pipeline routes with warning signals and buoys to minimize the danger of accidental damage by anchors, chains, cables, dredges and the like. In some cases, double-walled pipelines have been used to further reduce the risk of pollution in the event that accidental damage does occur. This has generally been feasible only for very short lines laid in shallow water. The chief difficulties have been the mechanics of simultaneously constructing one line inside the other and the problem of installing, by lay barge or by pulling, a double-walled line with its inherently high submerged weight. These and other technical problems have generally precluded the use of such lines between offshore production platforms and offshore or onshore storage facilities and similar installations where the lines must extend over reasonably long distance in relatively deep water.

SUMMARY OF THE INVENTION

This invention provides an improved method for the laying of double-walled pipelines between offshore platforms and offshore or onshore storage facilities and similar installations which avoids many of the problems encountered heretofore and makes the use of such lines feasible in deep water over reasonably long distances. The method involves the installation of an outer pipe string extending along the pipeline route from an offshore platform equipped with a riser or similar member having a relatively large radius bend near its lower end, the passage of a cable from the platform through the riser or similar member and the outer pipe string, and the moving of an inner pipe string through the riser into position within the outer pipe string. The two strings can then be connected to a double-walled riser at the pipeline terminus, the inner string can be pulled upwardly through a large radius bend and riser previously connected to the outer string, the inner string can be extended beyond the outer string and connected to a riser or shore installation, or both strings can be extended onto the beach for connection to an onshore facility. Regardless of the system employed at the pipeline terminus, the method of the invention permits the installation of double-walled pipelines over relatively long distances, provides a relatively inexpensive means for installing double-walled lines where pipeline damage must be guarded against or two different fluids must be conveyed simultaneously, and results in a highly stable line.

DESCRIPTION OF THE PREFERRED EMBODIMENTS

Figure 1:
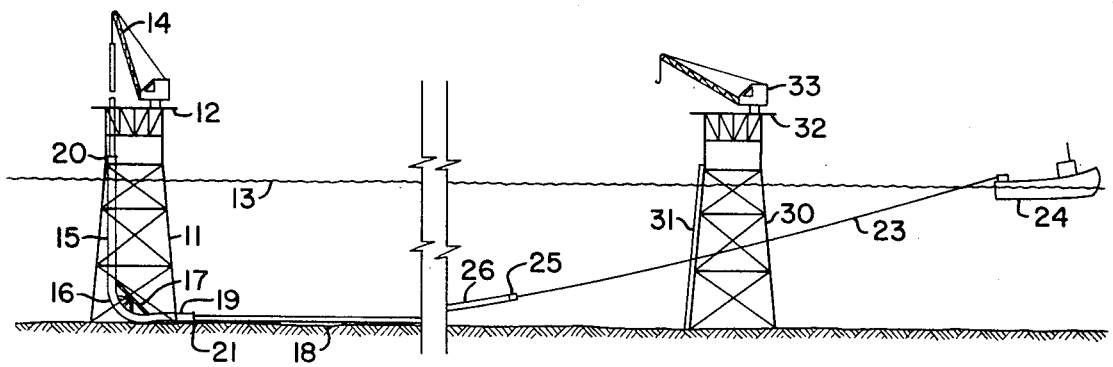
FIG. 1 in the drawing depicts the installation of an outer pipe string during the installation of a double-walled pipeline between two offshore platforms in relatively shallow water.

FIG. 1 in the drawing depicts an offshore platform 11 from which a double-walled pipeline is to be laid to a second offshore platform 30 in relatively shallow water. Platform 11 includes a deck 12 mounted above the surface of the water 13 and a crane 14 or similar device for handling pipe and heavy equipment. A curve conduit 15, commonly referred to as a reverse J-tube, has been installed on the platform. This is normally done ashore at the time the platform is fabricated but in some cases the conduit can be brought out to the platform and installed by divers. The conduit shown is a large diameter pipe which extends above the water's surface at its upper end and includes a large radius bend 16 near its lower end. As will be pointed out in greater detail hereinafter, this bend may have a radius of from a few feet to as much as 100 feet or more, depending upon the size of the pipeline to be installed and other factors. External bracing 17 has been provided to strengthen the bend. The lower end of the conduit will normally extend a substantially horizontal direction near the ocean floor 18 and will generally include a small straightening bend 19. As indicated by reference numerals 20 and 21, the upper and lower ends of conduit 15 are flared to facilitate the movement of pipe downwardly through the conduit. The method of the invention is not restricted to use with offshore platforms of the particular type shown in the drawing and, as will become more apparent hereafter, may be used with monopods and a variety of other different offshore structures.

The curved conduit or reverse J-tube 15 shown in the drawing is used for bending and subsequently straightening a string of pipe as the pipe is forced downwardly through the conduit or tube. The dimensions and configuration of the conduit will depend in part upon the size of the pipe to be handled, the physical properties of the pipe, the depth of the water in which the conduit is to be installed, and the geometry of the platform. Once these are known, the conduit dimensions and configurations necessary to permit bending of the pipe so that it will extend in the desired direction as it emerges from the conduit can be calculated. In most cases it will be preferred to position the conduit on or near the ocean floor as shown in the drawing and have the pipe extend from it in a substantially horizontal direction but in some instances the end of the conduit may be located above the bottom so that the pipe will extend down to the floor at an angle. In a typical installation of the type shown, the curved conduit may be fabricated from 16 inch extra heavy pipe provided with an approximately 90° bend having a radius of curvature of about 65 feet. The straightening section at the lower end may be about 20 feet long and will be provided with a reverse bend of about 2 ½° for removing residual curvature from the pipe as it emerges from the conduit. Such a system will normally be adequate for handling pipe approximately 12 inches in diameter. Conduits for the handling of larger or smaller pipe can be readily designed. In lieu of such a conduit, a series of mandrels, rollers, or similar bending members by means of which the pipe can be bent as it is moved downwardly can be used.

Platform 30 in the drawing is generally similar to platform 11 but includes a riser guide rail 31 extending from a point above the water level 13 to a point near ocean floor 18. This rail may be a wide flange steel beam, a channel, or a similar member to which clamps can be attached to hold the riser at platform 30 in place. The use of such a rail is not essential. Riser installation systems that do not require a guide rail or similar member have been described in the literature and will be familiar to those skilled in the art. The platform is provided with a deck 32 on which are mounted crane 33 and other equipment not shown in the drawing. It should again be noted that the method of the invention is not restricted to use with platforms of the particular type shown in the drawing and can be employed for the installation of pipelines between offshore structures of other types and between such structures and onshore installations.

Operations in which the method of the invention is carried out will normally start at platform 11 where the pipeline is to originate. After the platform has been installed with conduit or similar member 15 in place, a large diameter pipe string which is to form the outer portion of the double-walled pipeline is installed. This will normally involve the use of a cable extending through the curved conduit from the deck of the platform. Such a cable may be passed through the conduit and secured to the platform at the time the conduit is installed. It may instead be inserted later by attaching a light line to a buoyant pipeline pig that will pass through the conduit, pumping the pig and line downwardly in the conduit until they emerge from the lower end, and then using the line to pull the cable 23 through the conduit. It can also be installed with diver assistance. The free end of the cable is taken aboard a tug, pulling barge or similar vessel 24. The upper end of the cable on the deck of the platform is attached to a clamp or padeye on a plug or cap 25 which is in turn attached to the end of a section of the pipe 26 from which the large diameter outer pipe string is to be fabricated. The pipe section is then lubricated, preferably with a nonpolluting material.

The lubricated pipeline section is lowered into conduit 15 until the upper end reaches the working level on platform deck 12. A second pipeline section is picked up and raised into position above the first section. The ends of these two sections are welded together, and the joint is inspected and coated. After the joint has been completed, the pipe is again lowered in conduit 15. Lubricant is applied as the pipe enters the conduit. The length of the pipe sections employed will depend in part upon the capacity of the crane 14 or other equipment used for handling pipe on the platform but in most cases 40 to 80 foot sections will be used. When the pipe reaches bend 16 in the conduit, pulling of the pipe by means of cable 23 attached to tug or pulling barge 24 is commenced. The fore required to bend the pipe sufficiently to pass through bend 16 and then straighten it as it moves through straightening bend 19 will depend in part upon the size and type of pipe being handled, the configuration of the conduit, the weight of the pipe above bend 16, and other factors. In most cases, however, the force needed is generally relatively small. With 12 inch steel pipe having a wall thickness of 0.438 inch for example, 10,000 pounds of force is normally sufficient to pull the pipe through a 16 inch conduit having a bend with a 65 foot radius of curvature and a 2 ½° reverse bend in the straightening section. The amount of pull required for other systems can be readily calculated. The pipe emerging from the conduit exerts relatively little drag on the ocean floor because of the buoyancy contributed by the air in the line. The 12 inch pipe having a 0.438 inch wall thickness, for example, when filled with air has a specific gravity of about 1.04 when coated and in water weighs only about 2.25 pounds per foot. This makes the pulling of such a line over long distances feasible. In FIG. 1 of the drawing, the pipe has been pulled out from platform 11 a distance of several miles.

After the outer pipe string has been pulled into a position adjacent platform 30 as described above, the string can be picked up and the end can be cut off to permit flooding of the line as it is lowered back into place. Alternatively, the end of the pipe string can be fitted with a full-opening valve that can be opened to flood the line after it has been lowered back to the bottom. In lieu of thus raising the air-filled line to the surface so that it can be flooded, the end of the pipe string can also be fitted with a rupture disc or plug held by shear pins that can be removed by pumping water into the pipe string at the surface. After the line has been flooded, cable 23, used for pulling the pipe string into place, can be released by the tug or pulling barge and tied off at the platform or affixed to a buoy for later retrieval and use. Assuming that the outer pipe string has a diameter of 12 inches and a wall thickness of 0.438 inch as described earlier, the flooding operation will increase the weight of the line on bottom from about 2.25 pounds per foot to approximately 50 pounds per foot. This results in a highly stable line not apt to be seriously disturbed by bottom currents.

Figure 2:
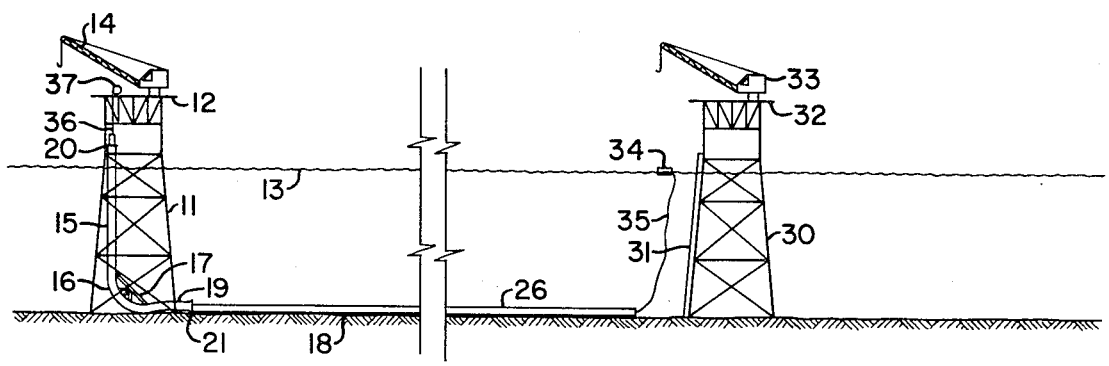
FIG. 2 illustrates a later stage in the operation of FIG. 1 after a cable has been passed through the outer pipeline.

An inner pipe string is installed in the outer pipe string by first pumping a buoyant pipeline pig having a light line attached to it through the outer pipe string from platform 11. The buoyant pig, indicated by reference 34 in FIG. 2, rises to the surface of the water after it emerges from the end of the outer pipe string. The light line 35 attached to the pig is used to pull a heavier line 36 through the pipeline from reel 37 on the platform deck 12. The end of this heavier line or cable is attached to a padeye or similar member on the closed end of a smaller diameter pipe to be used for fabricating the inner pipe string. An annular piston of rubber or similar material, not shown in the drawing, for maintaining a seal between this smaller pipe and the inner wall of the outer pipe string is mounted on the pipe behind the padeye. In lieu of this, a plug of rubber or the like which will act as a piston can be affixed to the cable in front of the padeye. The initial section of the inner string is then lubricated and introduced into the upper end of the outer pipe string on platform 11. Additional sections of the inner string were welded in place and the joints are coated and inspected as the pipe is moved downwardly into the outer string. As the pipe is moved, the piston displaces the water before it, leaving the annular space behind it filled with air. After the inner string reaches the bend in the outer string, force is applied to the pipe by means of cable 36 from tug or pulling barge 38 to pull the inner pipe string into place in the outer string. Movement of the inner string within the outer string can be assisted by pushing or pulling the inner string downwardly on platform 11. For the 12 inch diameter outer string referred to earlier, the inner pipe string will typically be 10 inch steel pipe having a wall thickness of 0.365 inch. Centralizers can be mounted at regular intervals on the inner string to reduce drag on the inner wall of the outer string. The use of these in conjunction with an effective lubricant will normally permit installation of the inner string without requiring excessive force.

Figure 3:
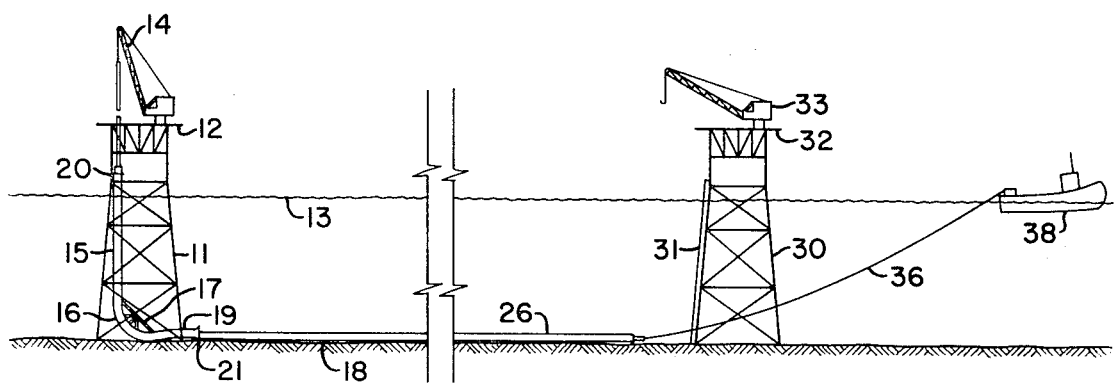
FIG. 3 shows the installation of an inner pipe string in the outer pipe string of FIGS. 1 and 2.
Figure 4:
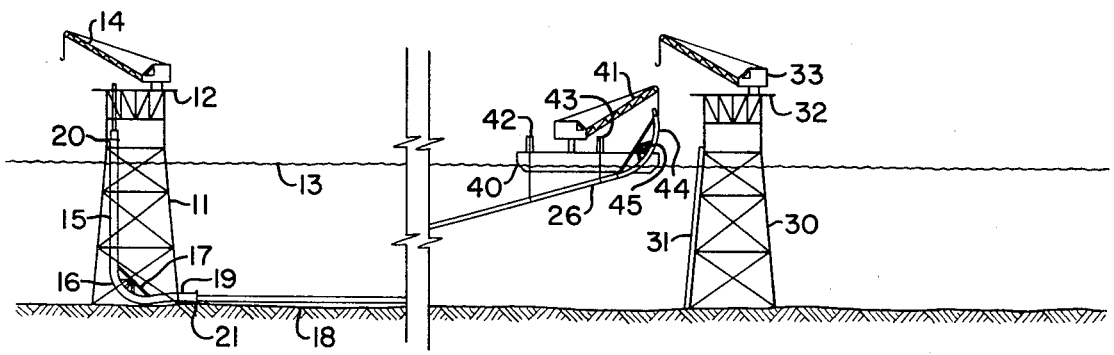
FIG. 4 illustrates one method of terminating the double-walled pipeline of FIG. 3 at an offshore platform.
Figure 5:
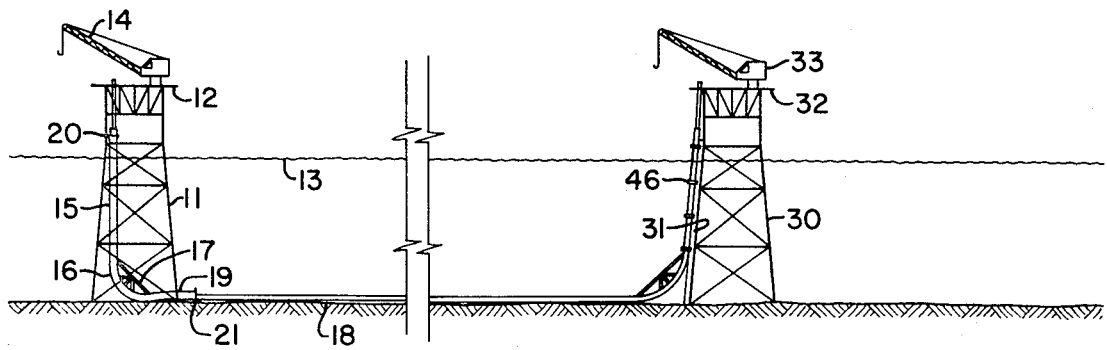
FIG. 5 depicts the finished double-walled pipeline following completion of the operations of FIG. 4.

After the end of the inner pipe string reaches the end of the outer pipe string as shown in FIG. 3 of the drawing, the pulling operation is terminated. Care should be taken at this point to avoid pulling the piston from the outer pipe string and thus flooding the annular space between the strings. If desired, the outer string can be provided with a collar to prevent this from occurring. A barge 40 provided with a crane 41 and davits 42 and 43 is brought up and moored at a point near the ends of the pipe strings. The pipe strings are then lifted from the ocean floor by means of cables lowered from davits 42 and 43. Since both strings are now filled with air, their weight will be considerably less than it would be if the strings were flooded. At the same time, tension will normally be applied to the two strings by means of cables extending to a tug or pulling barge not shown in the drawing. After the two pipe strings have been raised to a point above the water's surface, the lengths are adjusted to accommodate a prefabricated pipeline riser bend 44. This bend includes inner and outer conduits corresponding to the inner and outer pipe strings and is provided with external bracing 45 to stiffen the assembly. The bend is lifted into position by means of crane 41 on barge 40 as shown in FIG. 4. The inner conduit in the bend assembly is then welded to the inner pipe string and the joint is inspected and coated. After this has been done, the outer conduit is welded in place to the outer pipe string and again the pipe is inspected and coated. The pipeline and attached bend assembly are next lowered in the water by means of crane 41 and davits 42 and 43 until the upper end of the bend is positioned near the deck of the barge. With the line held in this position, straight sections of riser conduit having the same diameters as the inner and outer pipe strings are hoisted into position above the upper end of the bend assembly and then welded in place. The weld on the inner conduit is completed, inspected and coated first. After this has been done, the outer riser conduit is moved downwardly until it abuts against the outer bend conduit and this joint is welded, inspected and coated. Additional straight sections of inner and outer riser conduit are added by lowering the assembly further in the water and welding them in place as described until the double-walled riser extends upwardly along guide rail 31 on platform 30 to a point above the water's surface. Clamps 46 are then installed to secure the outer riser conduit to the guide rail as shown in FIG. 5 of the drawing. This can be done by means of divers or by installing sliding clamps on the outer riser conduit and guide rail and then sliding these downwardly into the desired positions. The assembly is made fast by welding the outer conduit to the guide rail above the surface of the water. It will be understood that the method of the invention is not restricted to this particular system for installing the riser conduits at platform 30 and that other systems may be used. A variety of different riser installation methods that can be employed have been described in the literature and will be familiar to those skilled in the art.

The double-walled pipeline installed as described above may be used for the simultaneous transmission of two different fluids between the two platforms. The annular space between the inner and outer conduits can instead be filled with a noncorrosive fluid and equipped with pressure monitoring equipment to detect either a decrease in pressure normally indicating a leak in the outer pipe string or an increase in pressure indicative of a leak in the inner string. Such a system provides a safe and effective means for detecting any damage to the line and thus avoids pollution of the water by fluids transmitted through the pipeline system. The method is equally attractive for the installation of double-walled pipelines being offshore platforms or similar structures and onshore facilities.

By the proper selection of pipe weights and sizes, the pulling forces required for installation can be minimized and yet the final result is a highly stable, composite line with sufficient weight to remain in place on the bottom in areas where seasonal or storm-generated bottom current might otherwise cause difficulties. Although the cost for the double-walled line will be somewhat higher than that for a single line, these advantages will often more than offset the additional investment required.

Figure 6:
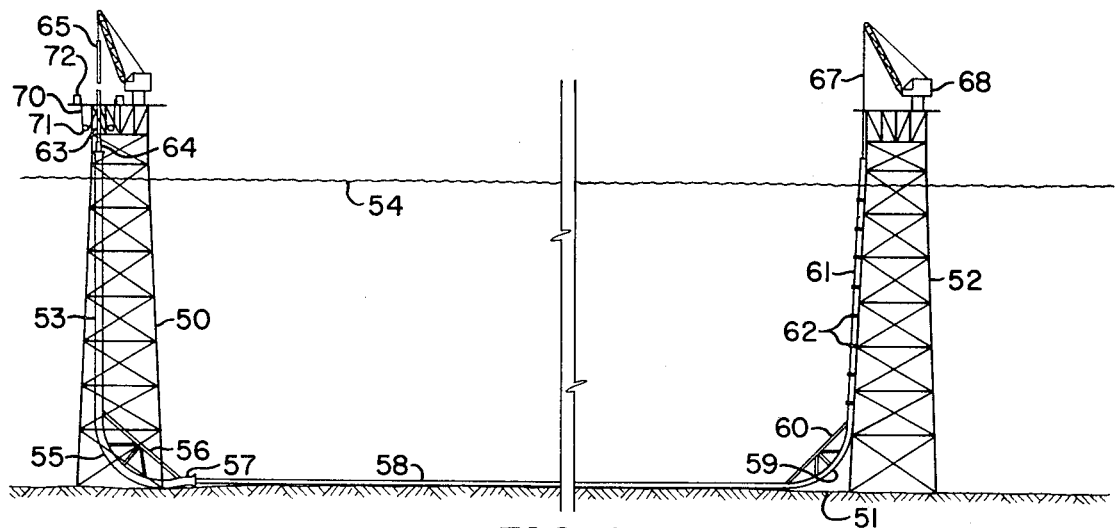
FIG. 6 illustrates an alternate embodiment of the invention in which a double-walled pipeline is installed between two offshore platforms in somewhat deeper water.

FIG. 6 in the drawing illustrates another embodiment of the invention which is particularly effective for the installation of double-walled pipelines in relatively deep water. The operation shown involves the installation of a double-walled pipeline extending from offshore platform 50 along the ocean floor 51 to a second platform or similar offshore installation 52. The two platforms may be 10 miles or more apart. Platform 50 has been provided with a reverse J-tube or similar conduit 53 extending from a point above the surface of the water 54 to a point near the base of the platform.

The conduit includes a bend 55 provided with external bracing 56 and a straightening section 57. In most cases the conduit assembly will be fabricated and installed on the platform before the structure is towed to the location and erected.

Outer pipe string 58 has been installed between platforms 50 and 52 in FIG. 6 by pulling the pipe downwardly through conduit 53 and along the ocean floor by means of a cable attached to a pulling barge or similar vessel. A bend 59 having a relatively large radius of curvature and provided with external bracing 60 has been connected to the end of the pipeline near platform 52 and riser 61 has been installed so that it extends from the bend to a point above the water's surface. Clamps or similar members 62 have been installed to secure the riser to the platform structure. Any of a variety of different methods for installation of the riser may be employed, including the method described in conjunction with FIG. 4 above. At this point, the outer pipe string extends between the two platforms and is equipped with a riser at each end. Depending upon the method employed for installing the riser at platform 52, the line may be either filled with air or flooded.

The double-walled pipeline is completed between platforms 50 and 52 as shown in FIG. 6 by moving an inner pipe string into position within outer string 58. This is done by pumping a pig having a light line connected to it from one platform through the outer string to the other platform. If the outer pipe string has not been flooded previously, the pig can be passed through the line as water is pumped into it from one of the platforms. After the light line has reached its destination, a heavier line is pulled into place through the outer pipe string. An initial section of the pipe to be used to form the inner string is plugged at its lower end and fitted with a padeye or similar member to which the pulling cable can be attached. This initial section is then lubricated and lowered into the outer pipe string at platform 50. Additional pipe sections are welded in place end-to-end as the inner string is lowered within the outer string, each section being lubricated to facilitate its passage trough the line. FIG. 6 shows the upper end of the inner string 63 protruding from the upper end 64 of outer string 58 at platform 50. An additional pipe section 65 is being moved into position by crane 66 to permit welding of the section in place.

After the end of the inner pipe string reaches the bend in the outer string near the bottom of platform 50, tension is applied by pulling on cable 67 above the upper end or riser 61 at platform 52. As shown in FIG. 6, crane 68 is being used to pull the cable. In lieu of using a crane in this manner, the cable can be pulled by means of winches or by passing it over sheaves and attaching the end to a pulling barge or similar vessel. Simultaneously, the inner pipe string can be forced downwardly at platform 50. One or more cables 70 can be connected to the upper end of the pipe near the deck of the platform, passed downwardly over a sheave 71 and connected to a winch 72 to apply downward force to the inner pipe string. In lieu of this, hydraulic cylinders or mechanical devices can be employed to force the pipe downwardly in the outer string. If sufficient force is applied at the upper end of the inner string, it is often possible to move the string through the outer string with the application of little or no force at the other end.

The total force required to move the inner pipe string into position within the outer string will normally be somewhat greater than that required to pull the outer string into position because the inner string must be pulled to the riser bend at the terminating platform 52. The force needed can be minimized by fabricating the riser bend at the terminating platform to the greatest practical radius of curvature. For example, if the outer pipe string has a diameter of 12 inches and the radius of curvature of the riser bend at the terminating platform is 40 feet, the total force required to pull a 10 inch inner string through the bend will normally be less than 50,000 pounds. The inner string will exert virtually no drag within the horizontal portion of the outer string if the pipe used in the inner string is properly selected. As pointed out earlier, a 10 inch steel pipe with a wall thickness of 0.365 will have a specific gravity of about 1 when filled with air and will therefore tend to move freely through the flooded outer pipe string. This makes the installation of double-walled pipelines by the method of the invention feasible over relatively large distances and eliminates many of the problems that are frequently encountered in installing double-walled lines by other methods. As in the earlier case, the double-walled line installed as shown in FIG. 6 can be employed for the separate transmission of two different fluids between platforms 50 and 52. If this is to be done, the diameters of the inner and outer pipe strings will be selected to accommodate the volumes of the two fluids that must be handled. Where the primary purpose of the outer string is to provide added protection against damage to the inner string, on the other hand, the volume of the annular space between the strings is less important. The use of a relatively inert, noncorrosive fluid between the two strings and instrumentation to detect changes in pressure in the annular space provides an effective means for readily detecting damage to either the inner or outer string. Although all of the pipelines shown in the drawing are depicted as resting on the ocean floor, it will be understood that these lines can be buried if desired and will be in many cases.

Figure 7:
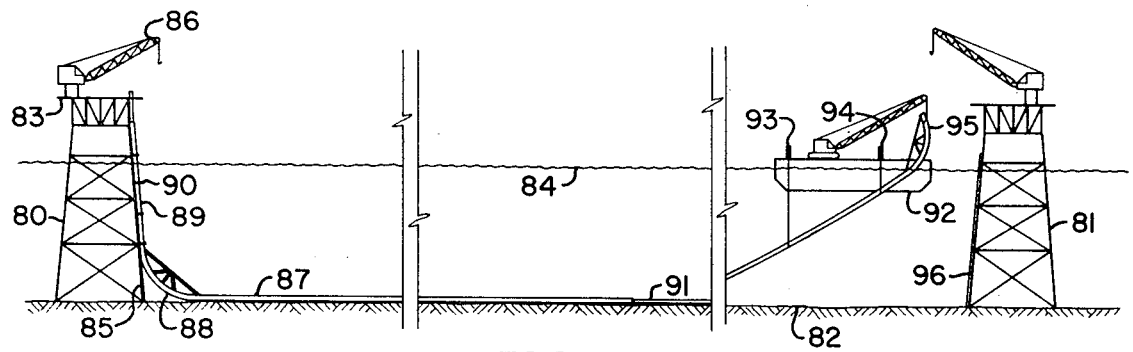
FIG. 7 depicts a further embodiment in which an inner pipe string is extended beyond an outer pipe string and connected to an offshore platform.

Still another embodiment of the invention is shown in FIG. 7 of the drawing. Here a submerged pipeline is to be installed between an offshore platform 80 and a second platform 81 located several miles away. This pipeline must traverse a zone where marine traffic is heavy and damage to the pipeline may occur. Because of this, it is desired to protect the pipeline over most of the route by means of an outer pipe string. Platform 80, at which the pipeline is to originate, may be of conventional design and will normally consist of a framework extending from the ocean floor 82 to a deck 83 located 50 feet or more above the surface of the water 84. As shown in the drawing, this platform has been provided with a guide rail 85 extending downwardly into the water and with a crane 86 and other equipment for handling pipe. An outer pipe string 87 which is connected by a bend 88 to a riser 89 extending up the side of the platform has been installed. The laying of this outer pipe string may be done by any of a variety of conventional methods. Typically, this may be accomplished by mooring a lay barge near the platform, welding the initial section of the pipeline to the riser bend while the bend is supported on the guide rail above the water's surface, and then adding riser sections above the bend as the riser is lowered in place along the guide rail and the pipeline is extended by moving the lay barge away from the platform along the pipeline route. As the riser is fabricated, it is attached to the guide rail by means of sliding clamps 90. Once the riser is in place on the guide rail, it can be secured by welding it to the rail at points above the water's surface. After the outer pipe string has been laid to the desired point, the lay barge can be dismissed. This method for installing risers at platforms or similar structures where pipelines originate has been described at length in the patent literature and will be familiar to those skilled in the art.

As indicated in FIG. 7, the outer pipe string 87 is terminated some distance from platform 81. The distance selected will depend in part upon the size of the pipeline which is to extend through the outer pipe string and upon the depth of the water adjacent platform 81. Typically, this distance may range from about 1,000 feet to about 2,000 feet or more. The size of the riser and outer pipe string and the radius of curvature of the riser bend are selected to permit pulling of the pipeline through them without difficulty. For a 16 inch pipeline, for example, an 18 inch riser and outer pipe string with a bend having a radius of curvature of about 70 feet may be used. The pipe sizes and configurations requires for a particular installation can be readily calculated.

After the outer pipe string has been laid as described above, the pipeline between the two platforms is installed by first passing a buoyant pig with a line attached to it through the outer string from platform 80. After the pig emerges from the line and reaches the surface, a heavier cable to be used in the pulling operation is pulled into place. The end of this cable is attached to the initial section of the 16 inch pipe on platform 80. This initial section is plugged at its lower end and provided with a padeye or similar member for connecting the cable in place. The 16 inch line is then fabricated section-by-section on the platform and pulled downwardly through the riser and outwardly through the outer pipe string by means of a pulling barge or similar vessel to which the other end of the cable is connected. The pipeline is lubricated as described earlier to facilitate its movement through the outer pipe string and may be forced downwardly through the riser in order to reduce the tension that must be applied by means of the cable and pulling barge. If 16 inch pipe having a well thickness of 0.531 inch is used, the air-filled line will have a specific gravity of about 1 and will be neutrally buoyant in the flooded outer string. This permits pulling of the line through the outer string over long distances. The flooded outer string will weight about 100 pounds per foot on bottom and therefore will remain stable during the pulling operation.

After the air-filled line 91 emerges from the end of the outer string, it can be raised to the surface by means of a barge 92 equipped with davits 93 and 94. Tension may be maintained in the line while it is suspended above the bottom by means of a cable extending to a pulling barge that does not appear in the drawing. The pipeline is then completed at platform 81 by installing a bend and riser. This can be accomplished as described earlier by welding a bend 95 to the end of the line while it is supported above the water's surface and subsequently adding riser sections above the bend as the assembly is lowered toward the bottom. After the riser has been fabricated and lowered into position adjacent the platform, it can be secured in place by attaching sliding clamps around the riser and a guide rail 96 on the platform structure as described earlier. Other riser installation methods can also be used. The completed pipeline will thus extend through the outer pipe string over most of its distance and, except for a relatively short section near platform 81, will be protected against damage. The use of a system of this type is often advantageous where the pipeline must cross an area in which damage may occur but where protection is not needed near the pipeline terminus.

Figure 8:
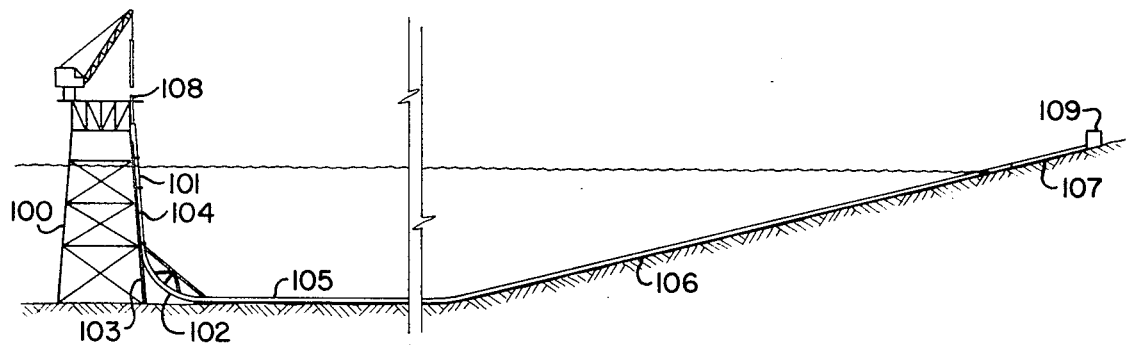
FIG. 8 shows still another embodiment in which both the inner and outer pipe strings are extended onto the beach for connection to an offshore installation.

FIG. 8 in the drawing depicts a further embodiment of the invention in which a double-walled pipeline is installed between an offshore platform 100 and an onshore storage facility or similar installation which does not appear in the drawing. Platform 100 may be similar to platform 80 in FIG. 7. As shown, it has been provided with a riser 101 and a large radius bend 102 which are held in place on guide rail 103 by clamps 104. Outer pipe string 105, connected to the lower end of the bend, has been laid along the ocean floor 106 onto the beach 107. The outer string can be laid into relatively shallow water by means of a lay barge as described above and then completed by pulling an additional section into position from the shore and connecting it in place. In lieu of this, it will often be preferred to install a conduit on the offshore platform and pull the outer pipe string downwardly through the conduit and across the ocean floor to the beach in accordance with the reverse J-tube method. Still other methods that may be employed for installation of the outer pipe string will be familiar to those skilled in the art.

The inner pipe string 108 of the double-walled pipeline of FIG. 8 is installed by first passing a line through the outer pipe string and then using this to pull a cable to which the inner pipe string is attached. The outer pipe string will normally be flooded during the pulling operation in order to achieve neutral buoyancy of the air-filled inner string. The pulling operation will normally be conducted by means of winches 109 located onshore. By properly selecting the inner and outer pipe sizes, using an effective lubricant, and applying force to the inner string on the platform, the amount of force required to pull the inner string into position within the outer string can be kept relatively low. After the inner string emerges from the outer string onshore, the two strings can be connected to the storage facility or other installation to permit either monitoring of the pressure in the annulus between the lines or the simultaneous movement of fluids through both the inner pipe string and the annular space.

It will be apparent from the foregoing that the invention provides a convenient and effective method for the installation of double-walled pipeline between offshore structures or an offshore structure and an onshore installation. In general the method is particularly advantageous where a double-walled line is to extend from an offshore platform to an oil storage facility or similar structure located onshore. Because there is no riser to be installed at the terminating end of the line, lines of relatively large diameter can be installed with little difficulty. The method is not restricted to the use of a cable for pulling the inner pipe string into position and can be carried out by first pushing a relatively small diameter pipe equipped with centralizers through the outer line and then using this to pull the inner pipe strings into place within the outer string. Using the reverse J-tube method, the inner string can normally be pushed from the platform all the way to shore without the need for cable or other pulling means. This and other variations of the method described above will be familiar to those skilled in the art.

I claim:

1. A method for installing a double-walled pipeline on the bottom of a body of water which comprises installing an outer pipe string extending along the pipeline route from a pipeline riser on an offshore structure, flooding said outer pipe string, moving an air-filled inner pipe string downwardly through said riser and into position within said outer pipe string, and thereafter connecting said inner pipe string in place at the pipeline terminus.

2. A method as defined by claim 1 wherein said inner piper string is pulled into position within said outer pipe string.

3. A method as defined by claim 1 wherein said outer pipe string is installed between said riser on said offshore structure and a second riser on a second offshore structure and said inner pipe string is moved downwardly through one of said risers, through said outer pipe string, and upwardly through the riser on the other offshore structure.

4. A method as defined by claim 1 wherein said outer pipe string is installed between said offshore structure and the shore and said inner pipe string is moved downwardly through said riser on said offshore structure and through said outer pipe string to the shore.

5. A method as defined by claim 1 wherein said outer pipe string is installed by pulling the outer pipe string downwardly through a conduit on said offshore structure, said conduit having a bend near the lower end thereof.

6. A method as defined by claim 1 wherein a lubricant is applied between the pipe strings as said inner pipe string is moved into position within the outer pipe string.

7. A method as defined by claim 1 wherein said inner pipe string is pushed downwardly into said riser at said offshore platform to move the inner pipe string into place in the outer pipe string.

8. A method for installing a double-walled, submerged pipeline between a first offshore platform and a second offshore platform which comprises installing an outer pipe string extending from said first platform along the sea floor to said second platform, said outer pipe string being connected to pipeline risers at said first and second platforms, passing a pulling cable through said outer pipe string, and thereafter pulling an inner pipe string downwardly through the pipeline riser at said first platform, through the completed outer pipe string, and upwardly through the pipeline riser at said second platform.

9. A method as defined by claim 8 wherein water is introduced into said outer pipe string and risers and air is maintained in said inner pipe string as the inner pipe string is pulled through said outer pipe string and risers.

10. A method as defined by claim 8 wherein said outer pipe string and the riser at said first platform are installed by pulling the pipe string downwardly through a bending member on said first platform.

11. A method for installing a double-walled pipeline on the bottom of a body of water which comprises pulling an air-filled outer pipe string downwardly through a bending member on a first offshore platform and outwardly along the pipeline route, flooding said outer pipe string, moving an air-filled inner pipe downwardly through said outer pipe string at said first platform and outwardly through said outer pipe string, and thereafter connecting said inner pipe string in place at a second offshore platform.

12. A method as defined by claim 11 wherein said outer pipe string is terminated short of said second offshore platform.

13. A method as defined by claim 11 wherein said inner and outer pipe strings are connected in place at said second offshore platform by installing concentric pipeline risers.

14. A method as defined by claim 13 wherein said concentric risers are installed by lifting said pipe strings from the bottom of said body of water and connecting riser sections in place as the pipe strings are lowered back to the bottom.

15. A method as defined by claim 11 wherein substantially all of the water in said outer pipe string is displaced from said pipe string as said inner pipe string is moved through the outer pipe string.

16. A method for installing a double-walled pipeline between an offshore platform and an onshore installation which comprises pulling an air-filled outer pipe string downwardly through a curved bending member on said platform and outwardly along the pipeline route to the shore, flooding said outer pipe string, forcing an air-filled inner pipe string downwardly through said outer pipe string at said platform and outwardly through said outer pipe string to the shore, and thereafter connecting said inner and outer pipe strings to said shore installation.

17. A method as defined by claim 16 wherein said inner pipe string is pushed through said outer pipe string from said platform.

18. A method as defined by claim 16 wherein said inner pipe string is pulled through said outer pipe string by means of a cable.

* * * * *

UNITED STATES PATENT OFFICE
CERTIFICATE OF CORRECTION

Patent No. 3,724,224    Dated April 3, 1973

Inventor(s) Jamie F. Matthews, Jr.

It is certified that error appears in the above-identified patent and that said Letters Patent are hereby corrected as shown below:

Page 1, change the name of the Assignee from "Esso Production and Research Company" to --Esso Production Research Company--.

Column 1, line 8, change "betWeen" to --between--;
Column 2, line 35, change "curve" to --curved--;
Column 2, line 50, after "extend", insert --in--;
Column 4, line 17, change "fore" to --force--;
Column 5, line 17, change "were" to --are--;
Column 6, line 45, change "being" to --between--;
Column 6, line 52, change "current" to --currents--;

Signed and sealed this 20th day of November 1973.

(SEAL)
Attest:

EDWARD M. FLETCHER, JR.
Attesting Officer

RENE D. TEGTMEYER
Acting Commissioner of Patents